M. B. CLASON.
METHOD OF AND APPARATUS FOR TESTING VISUAL ACUITY.
APPLICATION FILED OCT. 18, 1915.
1,174,547.
Patented Mar. 7, 1916.
2 SHEETS—SHEET 2.
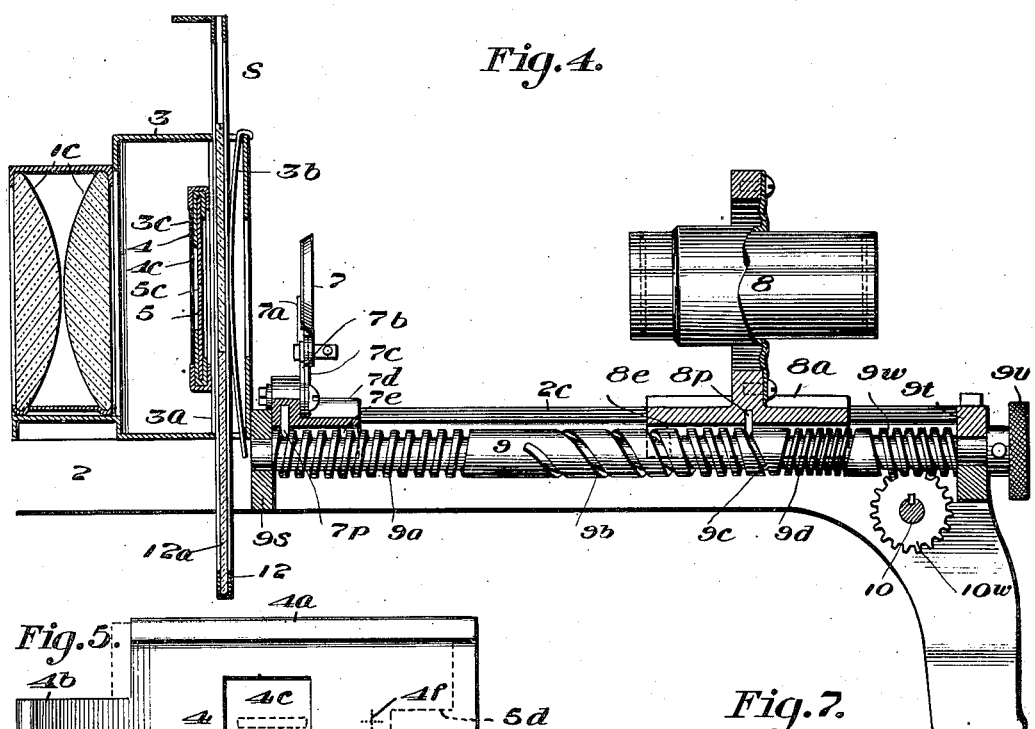
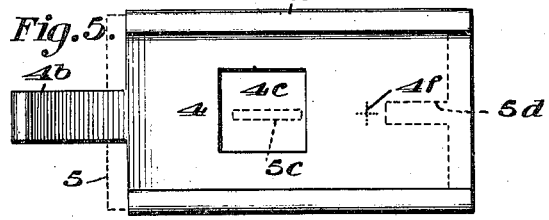
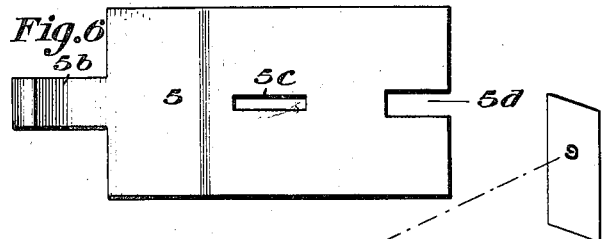
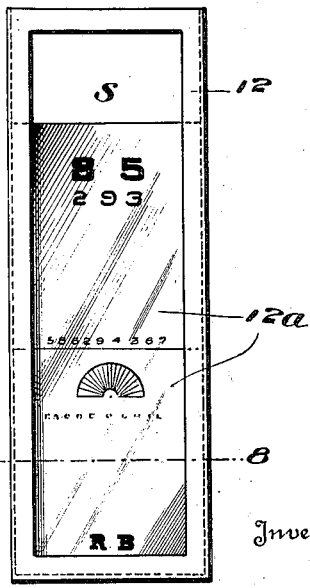
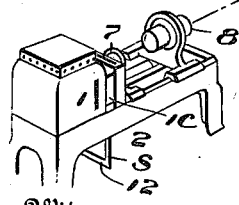

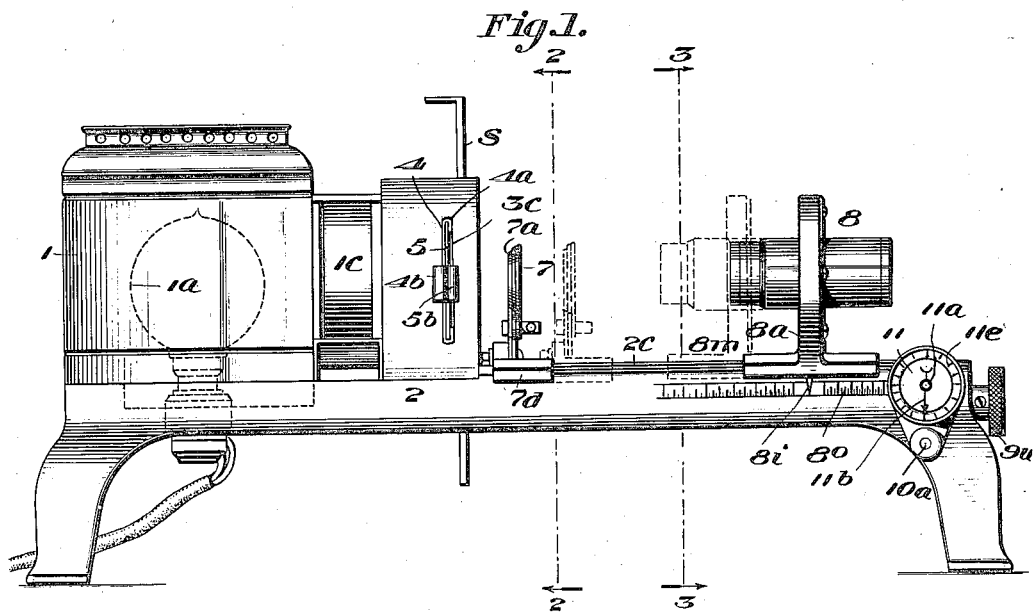
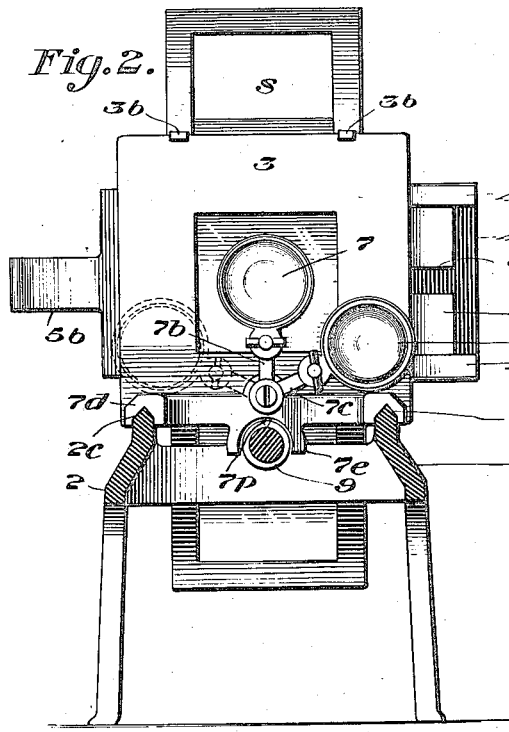
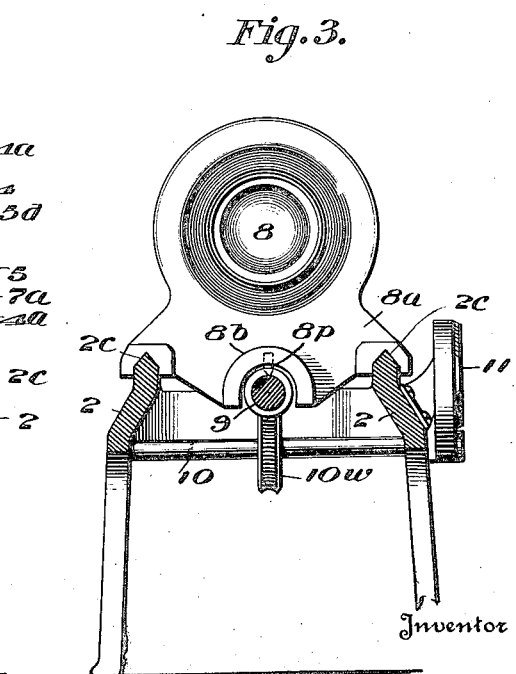

UNITED STATES PATENT OFFICE.

MILO B. CLASON, OF COLUMBUS, GEORGIA.

METHOD OF AND APPARATUS FOR TESTING VISUAL ACUITY.

1,174,547.  Specification of Letters Patent.  Patented Mar. 7, 1916.

Application filed October 18, 1915. Serial No. 56,442.

*To all whom it may concern:*

Be it known that I, MILO B. CLASON, a citizen of the United States, residing at Columbus, in the county of Muscogee and State of Georgia, have invented certain new and useful Improvements in Methods of and Apparatus for Testing Visual Acuity; and I hereby declare that the following is a full, clear, and exact description thereof, reference being had to the accompanying drawings, which form part of this specification.

This invention is a novel method of, and apparatus for, testing human eye-sight to determine the visual acuity of the eyes of the patient tested.

The method in brief consists in locating a person at a predetermined distance from a suitable background, projecting upon such background a character, or related group of characters, and enlarging or diminishing such character while maintaining it in focus until it is clearly seen by the patient, and mathematically determining the acuity of his vision according to the size of the projected character and the distance of the patient from the background at the time of the examination.

The apparatus in brief comprises novel means whereby the test characters may be projected individually, or in related groups, upon a suitable background, and such characters can be gradually enlarged or diminished in size while remaining in focus; indicating means, controlled or varied by the adjustment of the lenses. This novel apparatus should be located in a position convenient for the operator and at a predetermined distance from the background and the patient seated about the usual distance from the background, that he would be placed if using an ordinary visual chart; then when the patient can easily and clearly read the character projected on the screen, the operator can determine by the indicating means the acuity of vision of the patient.

The projected characters are used in place of the ordinary printed or painted charts and in such manner that instead of the patient having to select from a mass of characters of different size and kind, simultaneously exposed to his vision, that one which he thinks he can best distinguish among the lot, his attention is directed toward, and he can only see, one character, or related set of characters, (at the will of the operator) at a time, as the same are projected upon the screen during the examination, no other unrelated characters being visible to him at the time.

At the outset of the examination the operator can readily manipulate the parts quickly until he projects a character approximately the range of the patient's capability of vision; then by novel means such character may be varied in size, while kept in focus; and when the apparatus is adjusted so that the patient declares such character distinguished by him, the operator by looking at the indicator (which is automatically operated or varied by the adjustment of the lenses) can tell the exact acuity of vision of the patient.

The method and apparatus are employed simply to determine the acuity of vision of the patient and the apparatus is extremely sensitive and can easily detect and measure with mathematical exactness most minute variations in acuity of vision. Slides containing various characters suitable for the testing of eyes of children and illiterates may be provided; also slides suitable for detecting astigmatism.

The accompanying drawings illustrate one practical embodiment of the invention, it being understood that the invention is not limited to the specific forms, dimensions or constructions of parts shown in the drawings, as these are susceptible of variation while retaining the essentially novel characteristics and benefits of the invention.

The complete apparatus shown comprises a lamp box, condensing lenses, a slide holder in front of the condensing lenses, adjustable shutters preferably arranged in rear of the slide, a supplementary adjustable lens in front of the slide and shutters, and an adjustable projecting system of lenses in front of the supplementary lens; the parts being so arranged that the light will be projected through the condensing lenses, the opening in the shutters, the slide and the supplementary and projecting lenses. Also novel means for adjusting the supplementary lens and projecting system together and relatively to each other; and suitable indicating means are provided whereby the acuity of vision, after it has been ascertained by using the apparatus, can be noted by the operator.

In said drawings: Figure 1 is a side elevation of the complete apparatus. Fig. 2 is an enlarged vertical transverse section on line 2—2 Fig. 1. Fig. 3 is a similar section on line 3—3, Fig. 1. Fig. 4 is an enlarged longitudinal central section through the adjustable lens portion of the apparatus. Figs. 5 and 6 are detail views of the adjustable shutters detached. Fig. 7 is a detail view of one of the slides. Fig. 8 is a sectional view of the slide on line 8—8 Fig. 7. Fig. 9 is a diagrammatic view illustrating the use of the apparatus.

As shown the apparatus comprises a lamp house or light box 1, of any suitable kind, within which is a suitable illuminator, an electric light $1^a$ being shown adapted to be connected in the usual manner with an electric lighting system.

In front of the lamp house is a condensing lens $1^c$, of any suitable kind, through which the light is transmitted. The lamp house and condensing lens are preferably mounted upon a frame 2 upon which the other operative parts of the apparatus are also mounted; and said frame may be of any suitable construction adapted to support the parts and enable the entire apparatus to be conveniently handled as a unit.

Mounted upon the frame 2, in front of the condensing lens $1^c$, is a box 3 in which the shutters and slides are adjustably mounted. The box is provided with preferably vertically disposed flanges $3^a$ adapted to guide the slide S, hereinafter explained: and bow springs $3^b$ may be provided to hold the slide in any adjusted position by friction.

A pair of adjustable shutters 4 and 5 are preferably arranged to slide laterally through suitable openings $3^c$ in the sides of the box 3. Shutter 4 may be provided with flanges $4^a$ on its top and bottom edges forming guides for the shutter 5, so that the latter is practically adjustable with and also adjustable upon the shutter 4. The shutter 4 may be provided with a projecting handle $4^b$ and the shutter with a handle $5^b$ by which they can be conveniently manipulated. The shutter 4 is also provided with an opening $4^c$; and the shutter 5 is provided with a narrow slot $5^c$, and with adjacent wider slot $5^d$ which slots are in the same horizontal plane as the opening $4^c$; and when the shutters are in place by properly shifting shutter 5 either of the slots $5^c$ or $5^d$ can be brought into register with the opening $4^c$ in shutter 4, and thus an opening of greater or less extent or size can be formed through the shutters through which opening the light passes from the condensing lens through the slide. The shutter 4 may also be provided with auxiliary muscle test apertures indicated at $4^f$, through which the light can be transmitted if desired.

Mounted in front of the shutters and slide are preferably two supplementary lenses 7 and $7^a$; the lens 7 being convex, and the lens $7^a$ concave. These lenses are adjustable so that either can be moved into operative position. These lenses may be mounted on swingable arms $7^b$ and $7^c$ respectively, which arms are pivotally attached to an adjustable member $7^d$, which may be slidably supported on guides $2^c$ on the frame 2; and this member $7^a$ can be adjusted toward or from the condensing lens for the purpose hereinafter explained.

Mounted upon the frame 2 in front of the said supplementary lenses 7, $7^a$, is a projecting lens or lens system 8, of any suitable kind; and this projecting lens is preferably mounted on a movable member $8^a$, which may also be slidably mounted upon the guide $2^c$. The projecting lens 8 is adjustable toward or from the supplementary lens 7, $7^a$, as and for the purpose hereinafter explained.

Any suitable means for adjusting the supplementary lens and the projecting lens may be employed; by which the supplementary lens and the projecting lens can be independently and simultaneously adjusted; it being essential that the projecting lens be adjustable longitudinally of the frame and relatively to the supplementary lenses with variable speed in order to maintain an exact focus of the character projected in all positions.

In the drawings a rotatable threaded shaft 9 is shown extending longitudinally of the frame and supported at its ends in bearings $9^s$, $9^t$ of any suitable kind on the frame. The portion of shaft 9 adjacent the member $7^d$ is provided with a spiral channel $9^a$ of regular pitch, which channel may be engaged with member $7^d$, as by a pin $7^p$ attached to member $7^d$, so that by turning shaft 9 the member $7^d$ and lenses thereon can be moved on the frame toward or from the condensing lens or toward and from the projecting lens. The shaft 9 is also provided with an irregular spiral channel $9^b$ which is reverse to channel $9^a$ and is of greatest pitch at its end adjacent channel $9^a$ and decreases in pitch as it recedes toward the outer end of the shaft. This channel $9^b$ is adapted to be operatively engaged with member $8^a$ as by pin $8^p$ on member $8^a$, and when so engaged by rotating shaft 9, lens 8 will be moved lineally toward or from the lenses 7, $7^a$, but at a different rate of speed. The shaft 9 is also provided with a spiral channel $9^d$ adjacent the outer end of channel $9^b$; and of irregular pitch but of less irregularity than the channel $9^a$, and reverse thereto. The adjacent ends of channel $9^b$, $9^d$ may be connected by a groove $9^e$ so that pin $8^p$ may traverse through groove $9^e$ from channel $9^b$ to channel $9^d$ or vice versa. The object and use of these various spiral channels will be hereinafter explained. The shaft 9 is also provided with a worm thread $9^w$ which engages a worm wheel $10^w$ on a transverse shaft 10 journaled in the frame so that this shaft 10 will be rotated when the shaft 9 is operated. The shaft 9 may be operated by any suitable means, as shown a milled disk $9^u$ is pinned to its outer end by which it can be readily operated by hand. If desired member $7^d$, may have its under side provided with a depending U-shaped bracket portion $7^e$, adapted to loosely embrace the shaft 9 and insure longitudinal movement of the member $7^d$ when the shaft is rotated. Similarly member $8^a$ may be provided with a depending U-shaped portion $8^e$ adapted to partially embrace shaft 9 and insure longitudinal movement of the member $8^a$ when the shaft 9 is rotated.

In the construction shown in Fig. 4 either the member $7^d$ carrying the supplemental lens 7 or $7^a$; or member $8^a$ carrying the projecting lens 8, can be quickly adjusted longitudinally of the shaft 9, so as to avoid the necessity of rotating said shaft a number of times if it is desired to adjust either or both said members a considerable distance lengthwise of the shaft: or if it is desired to adjust the member $8^a$ carrying the projecting lens from engagement with the channel $9^b$ into engagement with the channel $9^d$. Suitable indicating mechanism is provided, and operated by or upon the adjustment of the parts, whereby after the parts are finally adjusted to display a character best suited to the patient's vision, the operator can readily determine his acuity of vision and record such position of the parts. Such an indicating mechanism is conventionally illustrated in the drawings and comprises a scale $8^m$ on the frame 2 adapted to be traversed by a pointer $8^i$ on member $8^a$ when said member is engaged with the channel $9^b$ of the shaft 9; and the divisions of scale $8^m$ are spaced in proportion to the pitch of the channel $9^b$; so that when the pin $8^p$ is in engagement with the channel $9^b$ the member $8^a$ would be moved one division of said scale for each rotation of shaft 9 and in accordance with the pitch of said channel. A second scale $8^o$ on the frame is adapted to be traversed by the pointer $8^i$ on the member $8^a$ when said member is engaged with the channel $9^d$ on the shaft 9; said scale $8^o$ being divided according to the pitch of the channel $9^d$, so that when the pin $8^p$ is in engagement with the channel $9^d$ the member $8^a$ will be shifted the length of a related division of said scale $8^o$ for each rotation of the shaft 9. In order to obtain a still finer reading of the adjustment of member $8^a$, I preferably employ a metric indicator of any suitable kind. This indicator is shown conventionally in Figs. 1 and 3 and has a shaft $11^a$ driven from the shaft 10 by amplifying gearing (not shown), so that for each rotation of the shaft 9 the shaft $11^a$ will make one rotation; and a hand $11^b$ on shaft $11^a$ will indicate on the dial $11^e$ the fractional part of the movement of member $8^a$ with regard to each division of the scales $8^m$ or $8^o$. The scales and indicating devices should be accurately constructed and calculated so that the scales $8^m$ and $8^o$ will show the length of travel of the projecting lens for each rotation of shaft 9, and the indicator 11 indicate the fractional part of any division of scale $8^m$ or scale $8^o$ traversed by the member $8^a$. After the parts have been once adjusted to any particular position, and the indicated position of such parts noted, such parts can be readily replaced in the same positions if it should be desired to subsequently repeat the test.

The slide S is preferably composed of a frame 12 (Figs. 7 and 8) adapted to contain a transparent plate $12^a$ upon which the characters are negatively or positively printed in any suitable manner. A set of such transparent plates removably and interchangeably fitting in the frame 12, may be provided. Each of these plates $12^a$ bears a character or series of characters in the desired sequence or arrangement; so that any desired character may be readily displayed. I have simply indicated in Fig. 7 a plate $12^a$ provided with series of test characters like those used on ordinary visual test charts. Any one or more of the characters on a plate can be displayed at will by the operator by adjusting the slide and the shutters 4 and 5. Obviously a film bearing the desired characters could be used as and in place of the slide, and I consider such a film the equivalent of the slide or slides.

In the ordinary visual tests, a chart containing a number of various unrelated characters and groups of characters is shown the patient, and persons who have to undergo frequent refractive examinations of this kind often become so familiar with such charts that they will recognize a letter or character, and name it correctly, from memory or its association with other known characters rather than by true or distinct vision. In my invention however only such a letter or character or related group of characters is displayed to the view of the patient at one time as the examiner desires to have him see, and the examiner is able to magnify or diminish such characters imperceptibly as much as needed, and this greatly facilitates obtaining quick and accurate knowledge of the limits of the patient's vision; and the patient is not confused by being shown a number of unrelated characters simultaneously, and is therefore able to speak with certainty as to whether or not he can clearly see the character displayed.

Persons affected with astigmatism more readily recognize certain letters or characters than others, according to the degree and kind of the astigmatism present, and for such patients a slide depicting selected letters or characters suitable for astigmatic tests should be used, and the ability of the apparatus to readily vary the size of any such character at will of the operator enables him to ascertain the slightest quantity of astigmatism apparent.

In using the invention, the projecting apparatus should be placed at a predetermined distance, say 20 feet, from the screen or background upon which the images on the slide are to be projected, as the adjustments of the instrument are mathematically calculated upon such predetermined distance between the instrument and the background; the patient may be seated, and the operator seated beside the instrument where he can conveniently manipulate the parts so as to project upon the background any desired character which he may wish to use in testing the patient's eyes.

It is important for the success of my method and apparatus, and the standardizing of such method and apparatus, that the distance between the projecting apparatus and the background be predetermined and fixed so that different operators can use a similar apparatus with similar accurate results. The spiral channels $9^a$ and $9^b$ are mathematically calculated so that while they effect the shifting of the supplementary lens and the projecting lens as described, the focus will be maintained and the projected character will not be blurred or distorted, although it will change in size; but such change will be gradual and uniform and the character will grow or contract uniformly, and more or less slowly, according to the speed of rotation of the shaft 9. The scales and indicating devices should be mathematically calculated and accurately constructed so that the scales $8^m$ and $8^o$ will show the length of travel of the projecting lens for each rotation of shaft 9; and indicator 11 indicates the fractional part of any division of scale $8^m$ or scale $8^o$ traversed by the member $8^a$. The principal object of these scales and indicators being to register the exact amount of magnification or diminishing of the character displayed upon the screen; and by consulting the scales and indicators after any exposure the operator is able to tell the exact size or dimension of the character then exposed and record same. And at any time thereafter by consulting such record can readjust the parts in exactly the same position. With such an apparatus having a set of properly selected and character slides or films a great number of characters may be successively quickly displayed to a patient; and any of such characters can be magnified or diminished at will.

Operation: Preparatory to making a visual test the apparatus should be fixed at the predetermined distance from the background or screen, and the projecting lens adjusted to about the position shown in full lines in Fig. 4, intermediate the channels $9^b$ and $9^d$ so it can be readily engaged with either, and the supplementary lenses 7, $7^a$ turned out of the way. The patient being seated in required position, the operator successively projects upon the screen different characters from a selected slide S until a character becomes distinguishable to the patient. Then the shutters are adjusted so that only a single character, or relative group of characters is displayed to the view of the patient excluding all unnecessary characters confusing to the patient. The shutters can be readily shifted so that the examiner can rapidly determine the characters that are easily distinguished by the patient from those that are distinguished with difficulty. The procedure is adopted under ordinary refractive cases. The proper supplementary lens is then adjusted in place and a character of the size indicated by the preliminary test is displayed; then by adjusting the lenses the size of such character is increased or diminished gradually and minutely until the operator correctly determines what is the smallest possible character the patient can see; and when the parts are so adjusted the operator by consulting the scales can mathematically determine the acuity of vision of the patient being tested. If for example the patient can readily distinguish characters of a standard size, it is necessary in order to test his acuity of vision to employ characters smaller in size than standard, and therefore the diminishing or concave supplementary lens $7^a$ would be shifted into position to focus with the projecting lens, and the member $8^a$ carrying the latter would be shifted into engagement with the inner end of the spiral channel $9^d$. Then by rotating shaft 9 both lenses $7^a$ and 8 may be simultaneously shifted away from the condensing lens, but owing to the different pitches of the spiral channels $9^a$ and $9^b$ the projecting lens will move more slowly than the supplementary lens so that the focus will be maintained. By turning shaft 9 backward or forward the projected character can be diminished or increased until the operator satisfies himself that the patient properly sees the character displayed; and the operator can then tell by observing the position of the pointer $8^i$ relative to the scale $8^o$ and the pointer of the hand $11^b$ the smallest character which would be visible to the patient at a certain distance, and from the scale and indicator readings the operator can determine the subacuity of vision of the patient. And by recording such readings in making a subsequent test of the same patient he can adjust the lenses in accordance with such record in the same position they occupied at the time of such record and thus be able to make reliable comparative tests. If the patient's approximate range of vision should be below the standard; the enlarging or convex supplementary lens 7 should be positioned in focus with projecting lens 8, and the latter shifted so that the pin 8$^p$ enters the outer end of the spiral channel 9$^d$. Then by turning the shaft 9 the lenses 7 and 8 will be moved toward each other, the lens 8 however traveling toward the lens 7 with gradually increasing speed so that the lenses will be maintained in true focus in all positions. Such shifting of the lenses toward each other results in a gradual enlargement of the character projected on the screen or background; and without requiring the patient to move to or from the screen the same result is obtained as if he was to move closer to or farther away from the screen. The operator adjusts the apparatus until he is satisfied that the patient can properly see the character displayed, and when such adjustments have been made he can by observing the scale 8$^m$ and indicator determine what is the exact acuity of vision of the patient and make suitable records for future comparison.

This method and apparatus is especially useful in measuring the acuity of vision of illiterates and children who have not been taught to read, as special slides depicting objects familiar to illiterates or children can be used and such objects projected on the screen, one at a time, so that the patient's attention is attracted and he will more readily understand what is required of him, and the operator can tell by such patient's manner whether an object is not clearly distinguishable, for he will eagerly watch the picture on the screen as it gradually grows larger and more clear, and will name it the instant it is recognized clearly.

What I claim is:

1. The herein described method of testing human eye-sight consisting in projecting a selected character upon a suitable background and enlarging or diminishing such character while maintaining it in focus until it is clearly visible to the person being tested, thereby determining the visual acuity of the person, substantially as described.

2. The herein described process of testing human eye-sight consisting in locating a person at a suitable distance from a suitable back-ground, and projecting upon such back-ground a character, and enlarging or diminishing such character until it is clearly seen by the person, and mathematically determining the acuity of his vision according to the size of the projected character and the distance of the patient from the background.

3. The herein described process of testing human eye-sight consisting in locating a person at a predetermined distance from a suitable back-ground; projecting upon such back-ground a character, or related group of characters, and enlarging or diminishing such character while maintaining it in focus until it is clearly seen by the patient, and mathematically determining the acuity of his vision according to the size of the projected character and the distance of the patient from the back-ground.

4. Apparatus for testing human eye-sight comprising means for projecting a selected character upon a suitable back-ground, and means for varying the size of the projected character while maintaining the focus.

5. Apparatus for testing human eye-sight, comprising selected test characters, or related groups of test characters, and means for successively projecting same upon a suitable back-ground until a character or group is found which determines the acuity of vision of the patient whose sight is being tested.

6. Apparatus for testing human eye-sight comprising selected test characters, or related groups of test characters, and means for projecting same upon a suitable background, with means for varying the size of the projected character while maintaining such character in focus.

7. Apparatus for testing human eye-sight comprising selected test characters, or related groups of test characters, and means for successively projecting upon a suitable back-ground a single selected test character, or related groups of test characters, until a character or group clearly visible to the person being tested is found; with means for varying the size of the projected character while maintaining such character in focus; the acuity of vision being determined according to the size of the projected character and the distance of the patient from the screen.

8. Apparatus for testing human eye-sight comprising means for projecting a selected character upon a suitable back-ground, including a projecting lens, a supplementary lens, and means for relatively adjusting said lens to vary the size of the projected character while maintaining the focus.

9. Apparatus for testing human eye-sight comprising means for projecting a selected character upon a suitable back-ground including a projecting lens, a supplementary lens, and means for adjusting said lens simultaneously at different relative speeds to vary the size of the projected character while maintaining the focus.

10. Apparatus for determining visual acuity of the human eye, comprising a projecting apparatus including a projecting lens and a supplementary lens interposed between the illuminating means and the projecting lens, and means for relatively adjusting said projecting and supplementary lens to vary the size of the character projected on the screen while maintaining the focus.

11. Apparatus for determining visual acuity of the human eye comprising a projecting apparatus including a projecting lens, a condensing lens and a supplementary lens interposed between the condensing lens and the projecting lens, said projecting and supplementary lens being both dependently and simultaneously adjustable to vary the size of the character projected on the screen while maintaining the focus.

12. In apparatus for determining the visual acuity of the human eye; the combination of a light box, a condensing lens, a slide bearing test characters, and means for varying the passage of light through said slide; with a projecting lens, a supplementary lens interposed between the condensing lens and the projecting lens, and means for adjusting said projecting and supplementary lens to vary the size of the character projected on the screen while maintaining the focus.

13. In apparatus for determining the visual acuity of the human eye; the combination of a light box, a condensing lens, a slide bearing test characters, and shutters for varying the passage of light through said slide; with a projecting lens, a supplementary lens interposed between the screen and the projecting lens, and means for simultaneously but unequally adjusting said projecting and supplementary lens to vary the size of the character projected on the screen while maintaining the focus.

14. Apparatus for determining the visual acuity of the human eye, comprising a projecting apparatus including a projecting lens and a supplementary lens interposed between the slide and the projecting lens, said projecting and supplementary lens being simultaneously adjustable to vary the size of the character projected on the screen while maintaining the focus; and means operated by the adjustment of said lens whereby the acuity of vision is indicated.

15. Apparatus for testing human eyesight, comprising selected test characters, or related groups of test characters, and means for successively projecting same upon a suitable background until a character or group is found which determines the acuity of vision of the patient whose sight is being tested; and means whereby the acuity of vision is indicated.

16. Apparatus for testing human eyesight comprising selected test characters, or related groups of test characters, and means for projecting a selected character upon a suitable back-ground; with means for varying the size of the projected character while maintaining such character in focus, and means operated by the adjustment of said lens whereby the acuity of vision is indicated.

17. Apparatus for testing human eyesight comprising selected test characters or related groups of test characters, and means for successively projecting upon a suitable back-ground a single selected test character, or related group of test characters, until a character or group clearly visible to the person being tested is found; with means for varying the size of the projected character while maintaining such character in focus, the acuity of vision being determined according to the size of the projected character and the distance of the patient from the screen; and means operated by the adjustment of said lens whereby the acuity of vision is indicated.

18. In apparatus for determining the visual acuity of the human eye the combination of a light box, a condensing lens, a slide bearing test characters, and means for varying the passage of light through said screen; with a projecting lens, a supplementary lens interposed between the condensing lens and the projecting lens, said projecting and supplementary lens being adjustable to vary the size of the character projected on the screen while maintaining the focus; and means operated by the adjustment of said lens whereby the acuity of vision is indicated.

19. In apparatus for determining the visual acuity of the human eye; the combination of a light box, a condensing lens, a slide bearing test characters, and shutters for varying the passage of light through said slide; with a projecting lens, a supplementary lens interposed between the screen and the projecting lens, and means for simultaneously but unequally adjusting said projecting and supplementary lens to vary the size of the character projected on the screen while maintaining said lens in focus, and means operated by the adjustment of said lens whereby the acuity of vision is indicated.

20. In an apparatus of the character specified, the combination of a light box, a condensing lens, a slide, and means for controlling the light through the slide; with a pair of adjustable supports, lenses mounted on said supports, and a rotatable shaft having spiral channels operatively engaged with said supports whereby said supports may be simultaneously operated.

21. In an apparatus of the character specified, the combination of a light box, a condensing lens, a slide and means for controlling the light through the slide; with a pair of adjustable supports, lenses mounted on said supports, and a rotatable shaft having spiral channels operatively engaged with said supports whereby they may be simultaneously operated; and mechanism whereby the amount of movement of the said supports by the rotation of said shaft is indicated.

22. In an apparatus of the character specified, the combination of a light box, a condensing lens, a slide and means for controlling the light through the slide; with a pair of movable lens supports, a rotatable shaft adjacent these supports having spiral channels of different pitch adjacent the respective supports, and means on each support engaging the related channel, whereby when the shaft is rotated said supports are moved oppositely but at different speeds to maintain the focus; and mechanism whereby the amount of movement of the said holders by the rotation of said shaft is indicated.

23. In an apparatus of the character specified, the combination of a light box, a condensing lens, a slide and means for controlling the light through the slide; with a pair of movable lens supports, a rotatable shaft adjacent these supports having spiral channels of different pitch adjacent the respective supports, and means on the said supports engaged with the related channels, whereby when the shaft is rotated said supports are moved oppositely but at different speeds to maintain the focus.

24. In an apparatus of the character specified, the combination of a projecting lens holder, a shaft adjacent said holder having adjacent oppositely extending spiral channels, means on the said holder whereby it may be engaged with either channel, and means for rotating said shaft, each of said channels being of varying pitch.

25. In an apparatus of the character specified, the combination of a light box, a condensing lens, a slide and means for controlling the light through the slide; with a pair of movable lens supports, a rotatable shaft having spiral channels adjacent the respective supports, one of said channels being regular and the other channel of varying pitch, and means on each support engaging the related channel whereby when the shaft is rotated said supports are moved oppositely but at different speeds; with mechanism whereby the amount of movement of the said supports by the rotation of said shaft is indicated.

In testimony that I claim the foregoing as my own, I affix my signature in presence of two witnesses.

MILO B. CLASON.

Witnesses:
ARTHUR E. DEWELL,
W. WALLACE NAIRN, Jr.